United States Patent [19]

Takahashi et al.

[11] 4,380,702
[45] Apr. 19, 1983

[54] RADIATION IMAGE STORAGE PANEL

[75] Inventors: Kenji Takahashi; Junji Miyahara, both of Minami-ashigara, Japan

[73] Assignee: Fuji Photo Film Co., Ltd., Kanagawa, Japan

[21] Appl. No.: 168,801

[22] Filed: Jul. 11, 1980

[30] Foreign Application Priority Data

Jul. 11, 1979 [JP] Japan ................... 54-87813

[51] Int. Cl.$^3$ .............................................. G03C 5/16
[52] U.S. Cl. .............................. 250/327.2; 250/484.1
[58] Field of Search ............... 250/327.1, 337, 484, 250/368, 487, 486; 252/301.4 R, 301.4 H

[56] References Cited

U.S. PATENT DOCUMENTS

| | | | |
|---|---|---|---|
| 3,005,103 | 10/1961 | Hinson | 250/487 |
| 3,010,043 | 11/1961 | Wahlig | 250/487 X |
| 3,043,710 | 7/1962 | Patten et al. | 250/487 X |
| 3,859,527 | 1/1975 | Luckey | 250/337 X |
| 3,975,637 | 8/1976 | Ikedo et al. | 250/327.1 |
| 4,158,773 | 6/1979 | Novak | 250/368 X |

Primary Examiner—Davis L. Willis
Attorney, Agent, or Firm—Gerald J. Ferguson, Jr.; Joseph J. Baker

[57] ABSTRACT

A radiation image storage panel having a fluorescent layer which comprises a binder and a stimulable phosphor dispersed therein. Further, the panel has a light-reflecting white pigment layer on one side thereof with respect to the fluorescent layer opposite to the side exposed to the stimulating rays for said stimulable phosphor. The panel provides an image of high sharpness.

56 Claims, 45 Drawing Figures

F I G. 1
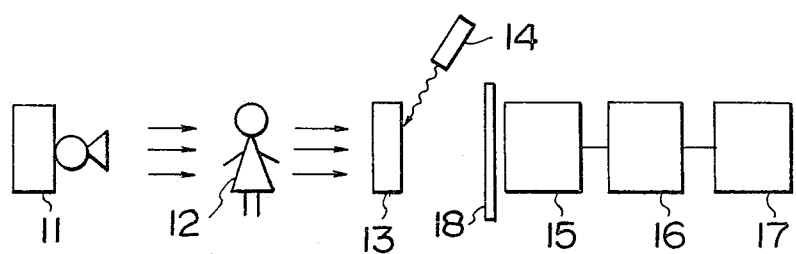
F I G. 2
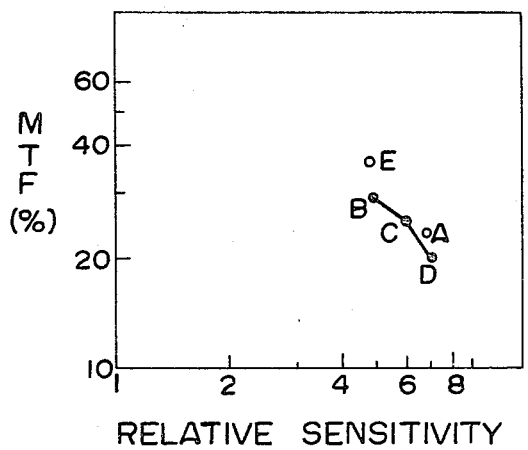

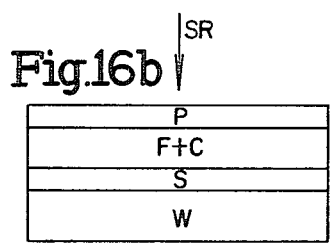
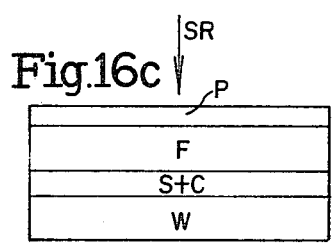
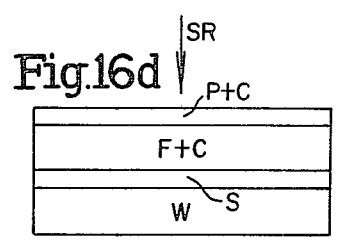
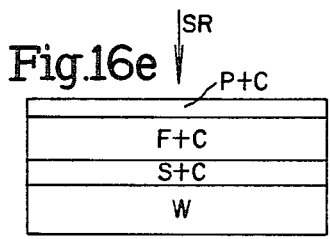
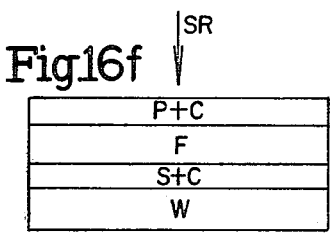
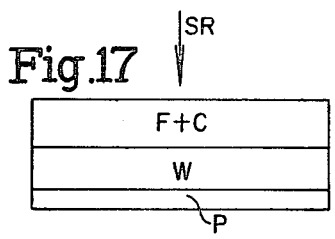
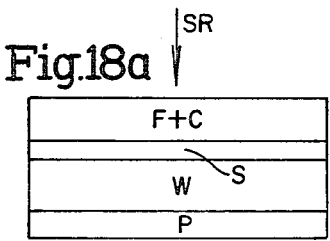
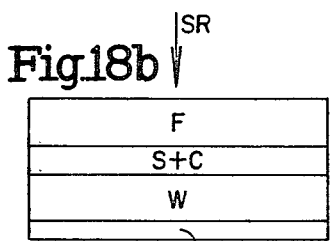
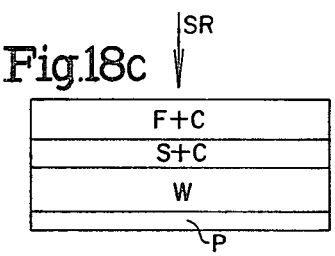
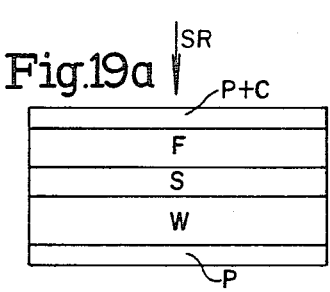
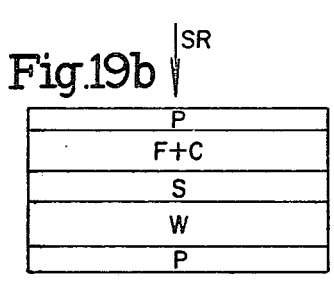
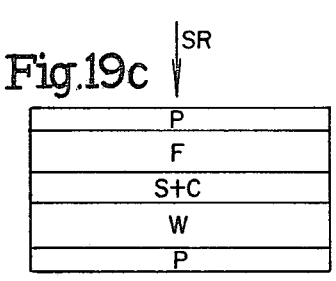
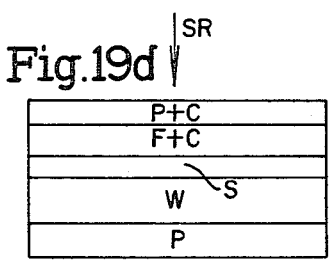
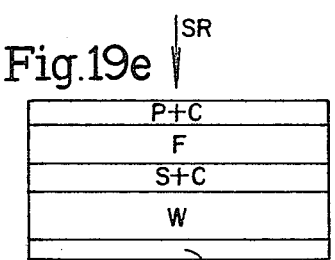
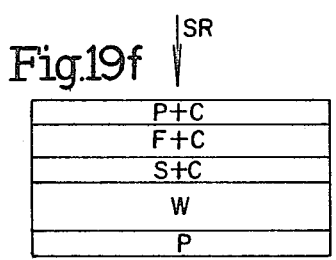

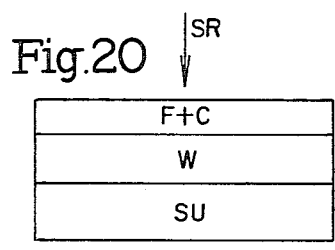
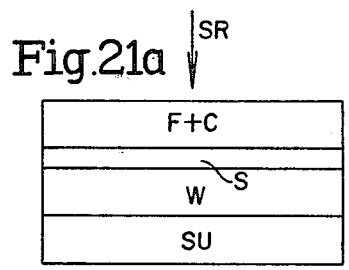
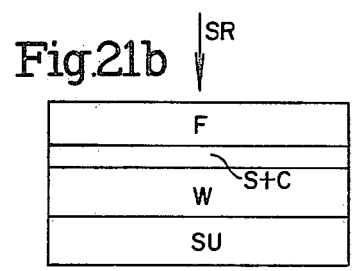
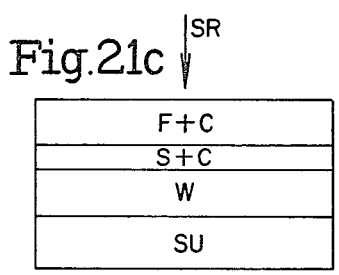
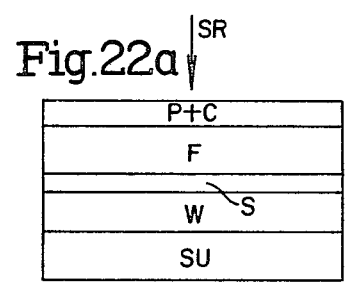
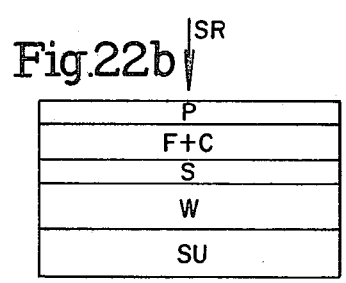
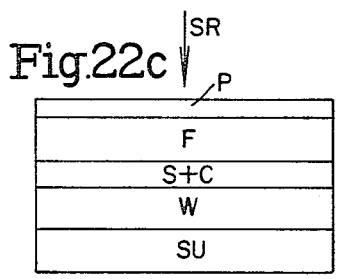
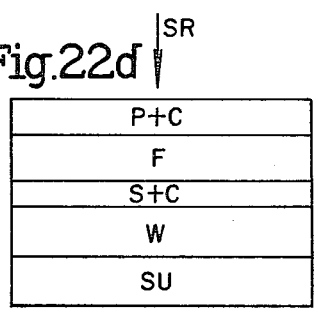
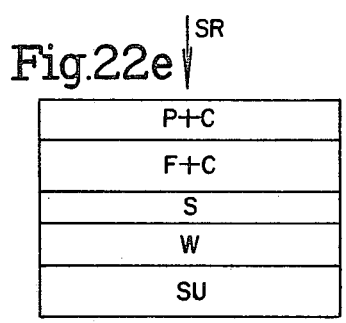
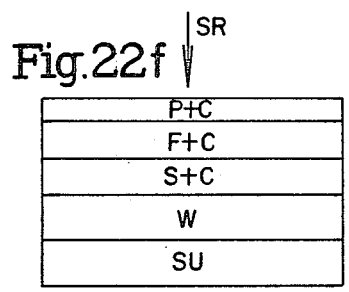

RADIATION IMAGE STORAGE PANEL

BACKGROUND OF THE INVENTION

1. Field of the Invention

This invention relates to a radiation image storage panel using a stimulable phosphor, and more particularly to a radiation image storage panel for recording and reproducing a radiation image using a stimulable phosphor which stores radiation energy and emanates the energy in the form of light upon stimulation thereof.

2. Description of the Prior Art

As is well known in the art, a photographic method using a silver salt such as radiography in which an X-ray film having an emulsion layer comprising a silver salt is used in combination with an intensifying screen has generally been employed to obtain a radiation image. Recently, from the viewpoint of problems such as shortage of silver resources, a method of obtaining a radiation image without using a silver salt has been desired.

An example of such a method is disclosed in U.S. Pat. No. 3,859,527. In the method of the patent, is used a radiation image storage panel comprising a stimulable phosphor which emits light when stimulated by an electromagnetic wave selected from visible light and infrared rays after exposure to a radiation (The term "radiation" as used herein means an electromagnetic wave or a corpuscular radiation such as X-rays, α-rays, β-rays, γ-rays, high-energy neutron rays, cathode rays, vacuum ultraviolet rays, ultraviolet rays, or the like.). The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the stimulable phosphor of the panel as light emission, and (iii) electrically converting the emitted light to an image.

The radiation image storage panel employed in the above-mentioned method for recording and reproducing a radiation image has at least a fluorescent layer comprising a proper binder and a stimulable phosphor dispersed therein. Although the fluorescent layer itself can be a radiation image storage panel when the fluorescent layer is self-supporting, the fluorescent layer is generally provided on a proper substrate to form a radiation image storage panel. Further, a protective layer for physically and chemically protecting the fluorescent layer is usually provided on the exposed surface of the fluorescent layer. Furthermore, a subbing layer is sometimes provided between the fluorescent layer and the substrate to closely bond the fluorescent layer to the substrate.

In the practical use of the above-mentioned method for recording and reproducing a radiation image, needless to say, it is desirable that the radiation image storage panel employed in the method not only has a high sensitivity, but also provides an image of high sharpness. However, the sensitivity of the conventional radiation image storage panel having such a structure as mentioned above and the sharpness of the image provided by the panel are incompatible with each other. Accordingly, when the sensitivity of the panel is heightened, the sharpness of the image provided by the panel is lowered, and reversely, when the sharpness is heightened, the sensitivity is lowered. That is, the sensitivity of the radiation image storage panel can be heightened by increasing the thickness of the fluorescent layer thereof. However, the thickness of the fluorescent layer is increased in order to heighten the sensitivity, the sharpness is lowered. Reversely, the sharpness can be heightened by decreasing the thickness of the fluorescent layer. However, when the thickness of the fluorescent layer is decreased in order to heighten the sharpness, the sensitivity is lowered. Since the above-mentioned incompatibility between the sensitivity and the sharpness of the conventional radiation image storage panel is substantially large, it has been difficult to obtain a radiation image storage panel which provides both practical sensitivity and sharpness. Accordingly, a radiation image storage panel which provides an image of higher sharpness than the conventional one at practical sensitivity is desired.

As described above, when the thickness of the fluorescent layer of the radiation image storage panel is increased, the sharpness of the image provided by the panel is lowered. This is because in the method for recording and reproducing a radiation image utilizing the stimulability of a stimulable phosphor, the sharpness of the image obtained depends upon the degree of spread of the stimulating rays in the panel, and the thicker becomes the fluorescent layer, the larger becomes the spread of the stimulating rays in the fluorescent layer. That is, in the method for recording and reproducing a radiation image utilizing the stimulability of a stimulable phosphor, the radiation image stored in the panel is taken out of the panel sequentially as described above. Therefore, all of the light emission caused by the stimulating rays at a certain period ($t_i$) is desirably detected as the output of a certain picture element ($x_i$, $y_i$) on the panel which is exposed to the stimulating rays during the period ($t_i$). When the fluorescent layer of the panel is thick, and therefore the stimulating rays spread in the fluorescent layer due to scattering or the like and stimulate the phosphor surrounding the picture element ($x_i$, $y_i$) in addition to the picture element ($x_i$, $y_i$), the output for the area broader than the picture element ($x_i$, $y_i$) is detected as the output of the picture element ($x_i$, $y_i$), and therefore, the sharpness of the image obtained is lowered.

SUMMARY OF THE INVENTION

In view of the above, an object of the present invention is to provide a radiation image storage panel which provides an image of higher sharpness than the conventional radiation image storage panel in comparison of the same sensitivity.

As described above, the sensitivity of the radiation image storage panel increases as the thickness of the fluorescent layer of the panel increases. However, as a result of the investigations in the radiation image storage panel, it was found that the rise of the sensitivity in the radiation image storage panel having a thick fluorescent layer is based on rather the light reflection than the light emission of the phosphor existing in the portion of the fluorescent layer which is far from the surface thereof upon which the stimulating rays impinge. Accordingly, by using a material having a higher light reflectivity (light reflectance per unit thickness) than the phosphor as the material of the portion of the fluorescent layer which is remote from the surface thereof upon which the stimulating rays impinge, the fluorescent layer can be thinned without lowering the sensitivity of the panel, thereby the spread of the stimulating rays in the fluorescent layer can be controlled and an image having a higher sharpness can be obtained. Based on the above-mentioned finding, in the radiation image storage panel of the present invention, a light-reflecting white pigment layer is provided on one side thereof with respect to the fluorescent layer opposite to the side exposed to the stimulating rays for said stimulable phosphor.

That is, the radiation image storage panel of the present invention has a fluorescent layer comprising a binder and a stimulable phosphor dispersed therein characterized in that a light-reflecting white pigment layer is further provided on one side thereof with respect to the fluorescent layer opposite to the side exposed to the stimulating rays for said stimulable phosphor.

In comparison of the same sensitivity, the radiation image storage panel of the present invention has a thinner fluorescent layer than the conventional radiation image storage panel. Accordingly, the spread of the stimulating rays due to scattering or the like in the fluorescent layer of the panel of the present invention is smaller than the conventional panel, and therefore, the panel of the present invention provides an image of higher sharpness than the conventional panel.

BRIEF DESCRIPTION OF THE DRAWINGS

FIG. 1 schematically shows the method for recording and reproducing a radiation image using the radiation image storage panel of the present invention, and FIG. 2 is a graph showing the relationship between the sensitivity of the radiation image storage panels of the present invention (A and E) and the conventional radiation image storage panels (B, C and D), and the MTF at 2 lp/mm of the image obtained by the panels.

FIGS. 3–22 are diagrammatic illustrations of different embodiments of radiation image storage panels for use in accordance with the invention.

DETAILED DESCRIPTION OF THE INVENTION

Figure 3:
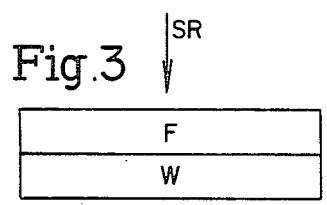

The present invention will hereinbelow be described in detail.

In the radiation image storage panel of the present invention, it is required for the light-reflecting white pigment layer provided on the opposite side of the side of incidence of the stimulating rays with reference to the fluorescent layer not only to efficiently reflect the light emitted by the stimulable phosphor upon stimulation thereof and to radiate the light from the side of the fluorescent layer upon which the stimulating rays impinge, but also to efficiently reflect the stimulating rays coming in the fluorescent layer and to cause the stimulating rays to efficiently stimulate the stimulable phosphor. From the viewpoint of the above, both the reflectance of the light-reflecting white pigment layer in the wavelength region of the light emitted by the stimulable phosphor upon stimulation thereof and the reflectance of the light-reflecting white pigment layer in the wavelength region of the stimulating rays are desired to be as high as possible. Generally, both the mean reflectances of the light-reflecting white pigment layer in the above-mentioned two wavelength regions are preferably not lower than 70%.

In general, the light reflecting white pigment layer is made by dispersing a white pigment in a proper binder to prepare a coating solution, and applying the obtained coating solution uniformly on the panel by the conventional coating method. As the white pigment, for example, titanium white, lead white, zinc sulfide, alumina, magnesium oxide and so forth are used. However, the white pigment is not limited thereto but may be of any kind so long as it provides a light reflecting white pigment layer which efficiently reflects the light emitted by the stimulable phosphor and the stimulating rays. Generally, the mean grain size of the white pigment is preferred to be 0.05 to 50$\mu$, and more preferably 0.1 to 10$\mu$. As the binder, is used protein like gelatin, polysaccharide like dextran, or a binder generally used in forming a layer such as gum arabic, polyvinyl butyral, polyvinyl acetate, nitrocellulose, ethyl cellulose, vinylidene chloride-vinyl chloride copolymer, polymethyl methacrylate, vinyl chloride-vinyl acetate copolymer, polyurethane, cellylose acetate butylate, polyvinyl alcohol and so forth. The binder is used in the amount within the range of 0.02 to 1 part by weight per one part by weight of the white pigment. However, the amount of the binder is preferred to be small from the viewpoint of reflectance of the light reflecting white pigment layer. In view of the easiness of forming the light reflecting white pigment layer and the desirable reflectance, the amount of the binder is preferred to be within the range of 0.05 to 0.5 parts by weight. Further, the thickness of the light reflecting white pigment layer is generally selected within the range of 5 to 50$\mu$.

The light-reflecting white pigment layer may be provided directly on the surface of the fluorescent layer opposite to the surface thereof upon which the stimulating rays impinge, or may be provided thereon via a subbing layer to closely bond the light-reflecting white pigment layer to the fluorescent layer. Further, in the radiation image storage panel of the present invention, a substrate or a protective layer may be provided on the opposite side to the fluorescent layer side with regard to the light-reflecting layer. Furthermore, a protective layer may be provided on the surface of the fluorescent layer upon which the stimulating rays impinge.

U.S. patent application Ser. No. 156,520 filed June 5, 1980 discloses a radiation image storage panel which is colored with a colorant to control the spread of the simulating rays in the panel and to improve the sharpness of the image obtained by the panel. The coloration of the radiation image storage panel with a colorant disclosed in the above application can also be applied to the present invention. By combining the coloration of the panel with a colorant with the placement of the light-reflecting white pigment layer, the sharpness of the image obtained by the panel can be markedly improved while the lowering of the sensitivity of the panel can be minimized. When the radiation image storage panel of the present invention is colored with a colorant, the coloration is conducted for the element or elements of the panel which are on the side exposed to the stimulating rays with respect to the light-reflecting white pigment layer. That is, it is possible to color the fluorescent layer, the protective layer and/or the subbing layer which exists on the side exposed to the stimulating rays with respect to the light-reflecting white pigment layer (As described above, the elements other than the fluorescent layer may not necessarily exist.). Generally, it is desirable that at least the fluorescent layer is colored with a colorant.

When the radiation image storage panel is colored with a colorant, it is required for the colorant employed in the coloration to have low reflectance to the wavelength of the stimulating rays and to absorb the stimulating rays when the radiation image storage panel is exposed thereto. Because of the absorption of the stimulating rays by the colorant, the spread of the stimulating rays in the panel due to irradiation in the fluorescent layer, halation in the protective layer or the subbing, or the like is controlled. As a result, the sharpness of the image obtained is improved. On the other hand, from the viewpoint of the sensitivity of the radiation image storage panel, it is required for the colorant employed in the coloration to have as high reflectance as possible to the wavelength of the light emitted by the stimulable phosphor upon stimulation thereof. That is, it is required for the colorant to have as low absorbance as possible to the above wavelength and not to lower the sensitivity of the panel. Accordingly, from the viewpoint of both the sharpness and the sensitivity of the radiation image storage panel, when the panel is colored with a colorant, a colorant the reflectance of which to the wavelength of the stimulating rays is lower than the reflectance thereof to the wavelength of the light emitted by the stimulable phosphor upon stimulation thereof is employed. More concretely, the colorant employed in the radiation image storage panel of the present invention has reflection characteristics that the mean reflectance thereof in the wavelength region of the stimulating rays of the stimulable phosphor employed in the panel is lower than the mean reflectance thereof in the wavelength region of the light emitted by the stimulable phosphor upon stimulation thereof. Accordingly, the radiation image storage panel of the present invention colored with such a colorant has reflection characteristics that the mean reflectance of the panel in the wavelength region of the stimulating rays of the stimulable phosphor employed in the panel is lower than the mean reflectance of the panel in the wavelength region of the light emitted by the stimulable phosphor upon stimulation thereof. From a viewpoint of improvement of the sharpness, the mean reflectance of the panel in the wavelength region of the stimulating rays of the stimulable phosphor employed in the panel is desired to be as low as possible. Generally, the mean reflectance is preferably not higher than 95% of the mean reflectance of the uncolored equivalent in the same wavelength region. When the mean reflectance is higher than 95%, the sharpness of the panel is not sufficiently improved. On the other hand, from a viewpoint of sensitivity, the mean reflectance of the panel in the wavelength region of the light emitted by the stimulable phosphor employed in the panel upon stimulation thereof is desired to be as high as possible. Generally, the mean reflectance is preferably not lower than 30%, more preferably not lower than 90% of the mean reflectance of the uncolored equivalent in the same wavelength region. The term "reflectance" as used herein means the reflectance measured by use of an integrating-sphere photometer.

The radiation image storage panel of the present invention has, for example, the following constitution. In particular, different embodiments of the radiation image storage panel of the present invention are diagrammatically illustrated in FIGS. 3–22 wherein SR indicates a stimulating ray; F indicates the fluorescent layer; W indicates the light-reflecting white pigment layer; S, the subbing layer; P, the protective layer; SU, the substrate; and C indicates the colorant.

1. Radiation image storage panel comprising a light-reflecting white pigment layer and a fluorescent layer disposed thereon as shown in FIG. 3.

Figure 4:
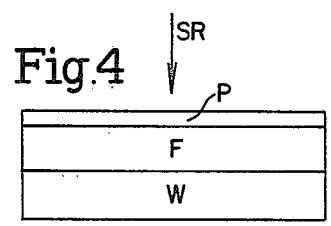

2. Radiation image storage panel comprising a light-reflecting white pigment layer, a fluorescent layer disposed thereon and a protective layer disposed further thereon as shown in FIG. 4.

Figure 5:
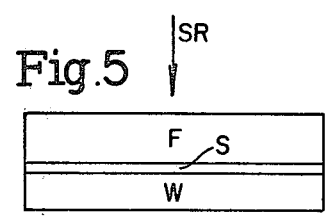

3. Radiation image storage panel comprising a light-reflecting white pigment layer, a subbing layer disposed thereon and a fluorescent layer disposed further thereon as shown in FIG. 5.

Figure 6:
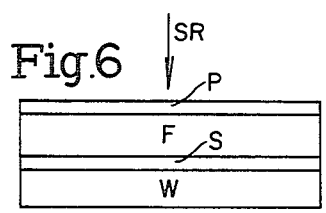

4. Radiation image storage panel comprising a light-reflecting white pigment layer, a subbing layer disposed thereon, a fluorescent layer disposed further thereon and a protective layer disposed further thereon as shown in FIG. 6.

Figure 7:
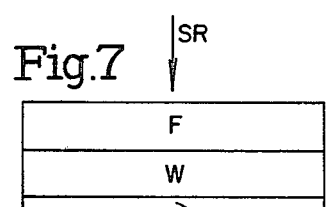

5. Radiation image storage panel comprising a protective layer, a light-reflecting white pigment layer disposed thereon and a fluorescent layer disposed further thereon as shown in FIG. 7.

Figure 8:
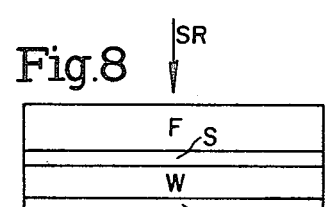

6. Radiation image storage panel comprising a protective layer, a light-reflecting white pigment layer disposed thereon, a subbing layer disposed further thereon and a fluorescent layer disposed further thereon as shown in FIG. 8.

Figure 9:
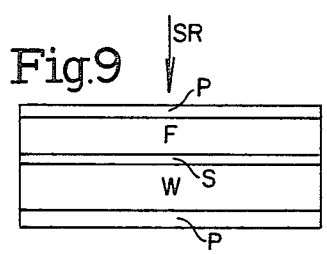

7. Radiation image storage panel comprising a first protective layer, a light-reflecting white pigment layer disposed thereon, a subbing layer disposed further thereon, a fluorescent layer disposed further thereon and a second protective layer disposed further thereon as shown in FIG. 9.

Figure 10:
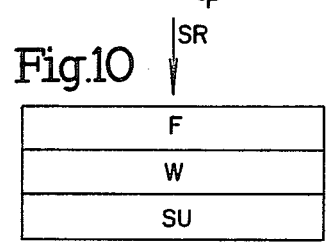

8. Radiation image storage panel comprising a substrate, a light-reflecting white pigment layer disposed thereon and a fluorescent layer disposed further thereon as shown in FIG. 10.

Figure 11:
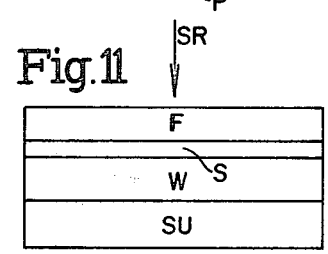

9. Radiation image storage panel comprising a substrate, a light-reflecting white pigment layer disposed thereon, a subbing layer disposed further thereon and a fluorescent layer disposed further thereon as shown in FIG. 11.

Figure 12:
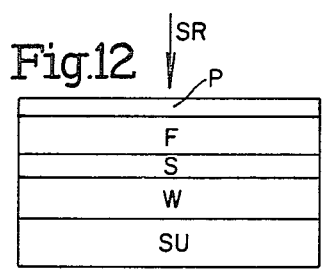

10. Radiation image storage panel comprising a substrate, a light-reflecting white pigment layer disposed thereon, a subbing layer disposed further thereon, a fluorescent layer disposed further thereon and a protective layer disposed further thereon as shown in FIGS. 12-a, 12-b and 12-c.

Figure 13:
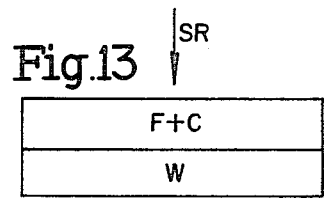

11. Radiation image storage panel comprising a light-reflecting white pigment layer and a fluorescent layer disposed thereon in which the fluorescent layer is colored with a colorant as shown in FIGS. 13-a, 13-b and 13-c.

Figure 14A:
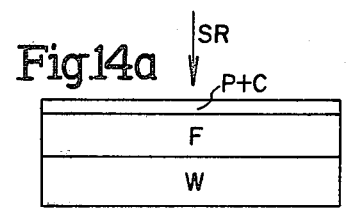
Figure 14B:
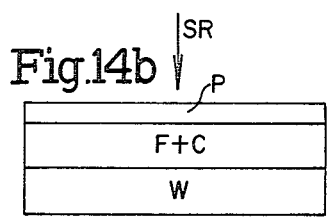
Figure 14C:
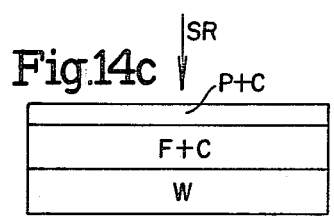

12. Radiation image storage panel comprising a light-reflecting white pigment layer, a fluorescent layer disposed thereon and a protective layer disposed further thereon in which the fluorescent layer and/or the protective layer is colored with a colorant as shown in FIGS. 14-a thru 14-f.

Figure 15A:
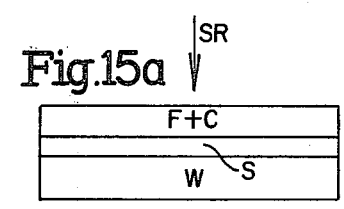
Figure 15B:
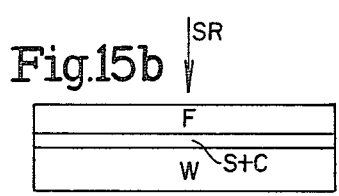
Figure 15C:
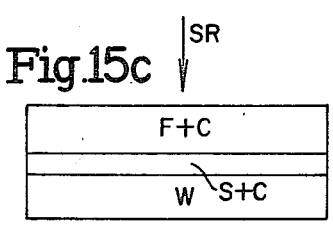

13. Radiation image storage panel comprising a light-reflecting white pigment layer, a primer layer disposed thereon and a fluorescent layer disposed further thereon in which the subbing layer and/or the fluorescent layer is colored with a colorant as shown in FIG. 15.

Figure 16A:
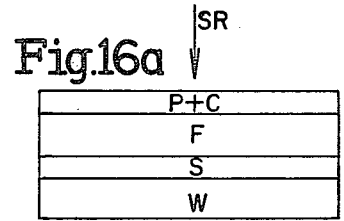

14. Radiation image storage panel comprising a light-reflecting white pigment layer, a subbing layer disposed thereon, a fluorescent layer disposed further thereon and a protective layer disposed further thereon in which at least one of the subbing layer, the fluorescent layer and the protective layer is colored with a colorant as shown in FIGS. 16-a thru 16-c.

15. Radiation image storage panel comprising a protective layer, a light-reflecting white pigment layer disposed thereon and a fluorescent layer disposed further thereon in which the fluorescent layer is colored with a colorant as shown in FIGS. 17-a thru 17-f.

16. Radiation image storage panel comprising a protective layer, a light-reflecting white pigment layer disposed thereon, a subbing layer disposed further thereon and a fluorescent layer disposed further thereon in which the subbing layer and/or the fluorescent layer is colored with a colorant as shown in FIG. 18.

17. Radiation image storage panel comprising a first protective layer, a light-reflecting white pigment layer disposed thereon, a subbing layer disposed further thereon, a fluorescent layer disposed further thereon and a second protective layer disposed further thereon in which at least one of the subbing layer, the fluorescent layer and the second protective layer is colored with a colorant as shown in FIGS. 19-a thru 19-c.

18. Radiation image storage panel comprising a substrate, a light-reflecting white pigment layer disposed thereon and a fluorescent layer disposed further thereon in which the fluorescent layer is colored with a colorant as shown in FIGS. 20-a and 20-b.

19. Radiation image storage panel comprising a substrate, a light-reflecting white pigment layer disposed further thereon, a subbing layer disposed further thereon and a fluorescent layer disposed further thereon in which the subbing layer and/or the fluorescent layer is colored with colorant as shown in FIG. 21.

20. Radiation image storage panel comprising a substrate, a light-reflecting white pigment layer disposed thereon, a subbing layer disposed further thereon, a fluorescent layer disposed further thereon and a protective layer disposed further thereon in which at least one of the subbing layer, the fluorescent layer and the protective layer is colored with a colorant as shown in FIG. 22.

As mentioned above, the stimulable phosphor which can be employed in the radiation image storage panel of the present invention is a phosphor which emits light when exposed to stimulating rays after exposure to a radiation. From the viewpoint of practical use, the stimulable phosphor should preferably be a phosphor which emits light having a wavelength ranging from 300 to 600 nm when exposed to stimulating rays having a wavelength ranging from 500 to 800 nm. For example, the stimulable phosphor which can be employed in the radiation image storage panel of the present invention includes (a) SrS:Ce,Sm, SrS:Eu,Sm, La$_2$O$_2$S:Eu,Sm, and (Zn,Cd)S:Mn,X wherein X is halogen, which are described in the above-mentioned U.S. Pat. No. 3,859,527; (b) ZnS:Cu,Pb, BaO.xAl$_2$O$_3$:Eu wherein x is a number satisfying the condition of $0.8 \leq x \leq 10$, and M$^{II}$O.xSiO$_2$:A wherein M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, which are described in U.S. Pat. No. 4,236,078; (c) (Ba$_{1-x-y}$,Mg$_x$,Ca$_y$)FX:aEu$^{2+}$ wherein X is Cl and/or Br, x and y are numbers satisfying the conditions of $0 < x+y \leq 0.6$ and $xy \neq 0$, and a is a number satisfying the condition of $10^{-6} \leq a \leq 5 \times 10^{-2}$, which is described in; (d) LnOX:aA wherein Ln is at least one element selected from the group consisting of La, Y, Gd and Lu, X is Cl and/or Br, A is Ce and/or Tb, and x is a number satisfying the condition of $0 < x < 0.1$, which is described in U.S. Pat. No. 4,236,078 and (e) (Ba$_{1-x}$,M$^{II}_x$)FX:yA wherein M$^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, which is described in U.S. Pat. No. 4,239,968, and the like. However, it is needless to say that the stimulable phosphor which can be employed in the radiation image storage panel of the present invention is not limited to the above-mentioned phosphors, and that any phosphor can be employed in the radiation image storage panel of the present invention provided that the phosphor emits light when exposed to stimulating lays after exposure to a radiation.

Generally, there is a tendency that the smaller becomes the mean particle size of the stimulable phosphor employed in a radiation image storage panel, the higher becomes the granularity thereof but the lower becomes the sensitivity thereof. Reversely, there is a tendency than the larger becomes the mean particle size of the stimulable phosphor employed in a radiation image storage panel, the higher becomes the sensitivity thereof but the lower becomes the granularity thereof. In consideration of these tendencies, the stimulable phosphor employed in the radiation image storage panel of the present invention is generally selected from those having a mean particle size ranging from 0.1 to 100μ, preferably from 1 to 30μ. Further, the amount of the stimulable phosphor employed is properly decided in view of the recording and reproducing performance and the economy of the radiation image storage panel. The amount of the stimulable phosphor is generally within the range of 3 to 300 mg per 1 cm$^2$ of the panel.

The fluorescent layer of the radiation image storage panel of the present invention is formed by dispersing the stimulable phosphor (This is the case wherein the fluorescent layer is not colored.) or the stimulable phosphor and the colorant (This is the case wherein the fluorescent layer is colored.) in a proper binder to prepare a coating dispersion, and then applying the coating dispersion by the conventional coating method to form an uniform layer. The fluorescent layer may be formed on the light-reflecting white pigment layer formed beforehand. Alternatively, the light-reflecting white pigment layer may be formed on one surface of the fluorescent layer formed beforehand. Further, the coating dispersion for forming the colored fluorescent layer may be prepared either by dispersing the stimulable phosphor and the colorant separately in the binder or by causing the colorant to adhere to the surface of the stimulable phosphor beforehand, and then dispersing the resulting mixture in the binder. As the binder, is used a binder which is usually used in forming similar to a binder used in forming the aforementioned a layer light-reflecting white pigment layer. Generally, the binder is used in an amount of 0.01 to 1 parts by weight per one part by weight of the stimulable phosphor. However, from the viewpoint of the sensitivity and the sharpness of the panel obtained, the amount of the binder should preferably be small, Accordingly, in consideration of both the sensitivity and the sharpness of the panel and the easiness of application of the coating dispersion, the binder is preferably used in an amount of 0.03 to 0.2 parts by weight per one part by weight of the stimulable phosphor. The thickness of the fluorescent layer is generally within the range of 10μ to 1 mm.

In the radiation image storage panel of the present invention, a substrate for supporting the light-reflecting white pigment layer and the fluorescent layer is generally provided on one side thereof with respect to the fluorescent layer opposite to the side exposed to the stimulating rays for said stimulable phosphor. As the substrate, various materials such as polymer material, glass, wool, cotton, paper, metal or the like can be used. From the viewpoint of handling of the panel as an information recording medium, the substrate should preferably be processed into a sheet or a roll having flexibility. In this connection, as the substrate are preferable plastic film such as cellulose acetate film, polyester film, polyethylene terephthalate film, polyamide film, polyimide film, triacetate film, polycarbonate film and the like; ordinary paper; and processed paper such as photographic paper, printing paper such as coated paper and art paper, baryta paper, resin-coated paper, sized paper described in Belgian Pat. No. 784,615 which is sized with polysaccharide, pigment-containing paper which contains a pigment such as titanium dioxide, sized paper which is sized with polyvinyl alcohol, and the like. The substrate may have a subbing layer on one surface (the surface on which the light-reflecting white pigment layer is provided) for the purpose of holding the light-reflecting white pigment layer tightly.

As described above, in the radiation image storage panel of the present invention, a subbing layer is sometimes provided between the fluorescent layer and the light-reflecting white pigment layer, or between the light-reflecting white pigment layer and the substrate. As the material of the subbing layer, an usual adhesive can be used. When the subbing layer provided between the fluorescent layer and the light-reflecting white pigment layer is colored with a colorant, the colorant is dispersed in the subbing layer.

Further, in the radiation image storage panel of the present invention, a protective layer for physically and chemically protecting the fluorescent layer is generally provided on one side thereof with respect to the fluorescent layer opposite to the side exposed to the stimulating rays for said stimulable phoshor. Furthermore, as described above, a protective layer is sometimes provided on the opposite surface of the light-reflecting white pigment layer to the surface thereof on which the fluorescent layer is provided. As the material of these protective layers, an usual material for a protective layer such as nitrocellulose, ethylcellulose, cellulose acetate, polyester, polyethylene terephthalate, and the like can be used. When the protective layer provided on the stimulable rays-incident surface of the fluorescent layer is colored with a colorant, either surface thereof may be colored, or both surfaces thereof may be colored, or the whole protective layer may be colored. Generally, the whole protective layer is homogeneously colored by dispersing therein a colorant.

When the radiation image storage panel of the present invention is colored with a colorant, the colorant employed in the panel depends upon the kind of the stimulable phosphor employed in the panel. As described above, from the viewpoint of practical use, the stimulable phosphor employed in the panel should preferably be a phosphor which emits light having a wavelength ranging from 300 to 600 nm when exposed to stimulating rays having a wavelength ranging from 500 to 800 nm. In combination with such a stimulable phosphor, a colorant having a body color ranging from blue to green is employed so that the mean reflectance of the panel in the wavelength region of the stimulating rays of the stimulable phosphor may be lowered down to below the mean reflectance of the panel in the wavelength region of the light emitted by the stimulable phosphor upon stimulation thereof, and that the difference therebetween may be enlarged. As the colorant, either an organic colorant or an inorganic colorant can be employed. For example, the organic colorant having a body color ranging from blue to green which can be employed in the radiation image storage panel of the present invention includes Zapon Fast Blue 3G (manufactured by Höechst AG.), Estrol Brill Blue N - 3RL (manufactured by Sumitomo Kagaku Co., Ltd.), Sumiacryl Blue F-GSL (manufactured by Sumitomo Kagaku Co., Ltd.), D & C Blue No. 1 (manufactured by National Aniline Co., Ltd.), Spirit Blue (manufactured by Hodagaya Kagaku Co., Ltd.), Oil Blue No. 603 (manufactured by Orient Co., Ltd.), Kiton Blue A (manufactured by Ciga Geigy AG.), Aizen Cathilon Blue GLH (manufactured by Hodogaya Kagaku Co., Ltd.), Lake Blue A.F.H (manufactured by Kyowa Sangyo Co., Ltd.), Rodalin Blue 6GX (manufactured by Kyowa Sangyo Co., Ltd.), Primocyanine 6GX (manufactured by Inahata Sangyo Co., Ltd.), Brillacid Green 6BH (manufactured by Hodagaya Kagaku Co., Ltd.), Cyanine Blue BNRS (manufactured by Toyo Ink Co., Ltd.), Lionel Blue SL (manufactured by Toyo Ink Co., Ltd.), and the like. For example, the inorganic colorant having a body color ranging from blue to green which can be employed in the radiation image storage panel of the present invention includes ultramarine blue, cobalt blue, cerulean blue, chromium oxide, pigment of $TiO_2$-ZnO-CoO-NiO system, and the like.

The radiation image storage panel of the present invention provides an image of high sharpness when used in the method for recording and reproducing a radiation image shown in FIG. 1. In the method, a radiation source 11, an object 12, a radiation image storage panel 13 of the present invention having a light-reflecting white pigment layer, a light source 14 emitting stimulating rays which stimulate the fluorescent layer of the panel 13 to release the radiation energy stored therein as fluorescent light, a photosensor 15 for detecting the fluorescent light emitted by the panel 13, a reproduction device 16 for converting an electrical signal obtained by the photosensor 15 to an image signal corresponding to the radiation image, a display device 17 for displaying the image, and a filter 18 for cutting the stimulating rays emitted by the light source 14 and reflected by the panel 13 and for transmitting only the fluorescent light emitted by the panel 13 are arranged as shown in FIG. 1. In the method shown in FIG. 1, the photosensor 15 is used as a detector for detecting the light emitted by the panel 13, and reproduction of a radiation image is performed by means of the photosensor 15, the reproduction device 16 and the display device 17. However, means for reproducing a radiation image is not limited thereto.

As shown in FIG. 1, the object 12 is positioned between the radiation source 11 and the radiation image storage panel 13. When the object 12 is exposed to a radiation from the source 11, the radiation passes through the object 12. The intensity of the radiation which has passed through the object 12 represents the transmittance of the object 12. Therefore, an image which represents the pattern of transmittance of the object 12 is obtained by means of the radiation impinging upon the radiation image storage panel 13. The radiation in the form of the image representing the pattern of transmittance of the object 12 is absorbed by the fluorescent layer of the panel 13, and electrons or holes are generated in the fluorescent layer. The amount of the electrons or holes generated are in proportion to the amount of the radiation absorbed. The electrons or holes are stored in the trap level of the stimulable phosphor, and thus, the radiation image is stored in the panel 13.

Then, the radiation stored in the panel 13 is visualized by stimulation with the stimulating rays emitted by the light source 14. That is, the fluorescent layer of the panel 13 is scanned with the stimulating rays emitted by the light source 14, whereby the electrons or holes stored in the trap level of the stimulable phosphor are expelled therefrom, and the radiation image stored in the panel 13 is released as fluorescent light. The luminance of the fluorescent light emitted by the panel 13 is in proportion to the number of the electrons or holes stored in the fluorescent layer of the panel 13, that is, the amount of the radiation absorbed thereby. The fluorescent light (light signal) is detected and converted to an electrical signal sequentially by the photosensor 15 such as a photomultiplier. The electrical signal obtained is converted to an image signal corresponding to the radiation image by the reproduction device 16, and a visible image is displayed by the display device 17. Thus, the radiation image is reproduced.

As shown in the following examples, in comparison of the same sensitivity, the radiation image storage panel of the present invention having a light-reflecting white pigment layer provides an image of higher sharpness than the conventional radiation image storage panel. That is, in the radiation image storage panel of the present invention, the large incompatibility between the sensitivity and the sharpness of the conventional radiation image storage panel is improved by providing a light-reflecting white pigment layer. Particularly, in the radiation image storage panel of the present invention to which the coloration of a radiation image storage panel with a colorant disclosed in U.S. Pat. application Ser. No. 156,520 filed June 5, 1980 is applied, the sharpness of the panel is markedly improved while the lowering of the sensitivity of the panel is minimized by the light-reflecting white pigment layer.

The present invention will hereinbelow be described referring to several examples.

EXAMPLE 1

8 parts by weight of BaFBr:$Eu^{2+}$ phosphor (stimulable phosphor) and one part by weight of nitrocellulose (binder) were mixed by use of a solvent (a mixture of acetone, ethyl acetate and butyl acetate) to prepare a coating dispersion having a viscosity of 50 centistokes. On the other hand, a composite laminate comprising a polyethylene terephthalate film (substrate) and a light-reflecting white lead layer having a thickness of about 20$\mu$ (light-reflecting white pigment layer: the weight ratio of the white lead to a binder being 8:1.) was formed. Then, the coating dispersion was uniformly applied to the light-reflecting white lead layer of the composite laminate and dried to form a fluorescent layer of a thickness of about 250$\mu$. The radiation image storage panel thus obtained was named "Panel A."

On the other hand, three kinds of radiation image storage panels (Panels B, C and D) were manufactured by applying the above coating dispersion to the surface of the above polyethylene terephthalate film substrate (The above deposited light-reflecting white lead layer was not provided thereon.), and then drying the coating dispersion applied to form fluorescent layers of the thickness of about 250$\mu$, about 300$\mu$ and about 350$\mu$, respectively.

Then, Panels A to D were exposed to X-rays of 80 KVp and 250 mA emitted by an X-ray source located at a distance of 180 cm from the panels, and thereafter, the panels were scanned from the fluorescent layer side (opposite side of the substrate) with a He-Ne laser beam (633 nm). The light emitted by the fluorescent layer of the panels was detected and converted to an electrical signal by a photosensor (a photomultiplier having a spectral sensitivity of type S-5). The electrical signal obtained was converted to an image signal by a reproduction device, and a visible image was displayed by a display device. The modulation transfer function (MTF) at 2 lp/mm of the image was obtained for Panels A to D. The results are shown in Table 1 below and FIG. 2 together with the relative sensitivity of the panels.

As is clear from Table 1 and FIG. 2, although the thickness of the fluorescent layer of Panel A is about 250$\mu$, Panel A has almost the same sensitivity as Panel D having a fluorescent layer of thickness of about 350$\mu$, and the sharpness of Panel A is higher than that of Panel D and slightly lower than that of Panel C having a fluorescent layer of thickness of about 300$\mu$.

EXAMPLE 2

A radiation image storage panel having a fluorescent layer of thickness of about 250$\mu$ was manufactured in the same manner as described in Example 1 except for adding 25 milligrams of Ultramarine Blue No. 1900 (inorganic blue colorant, manufactured by Daiichi Kasei Co., Ltd.) per 100 grams of the BaFBr:$Eu^{2+}$ phosphor. The radiation image storage panel thus obtained was named "Panel E."

Then, the MTF at 2 lp/mm of Panel E was measured in the same manner as described in Example 1. The result is shown in Table 1 below and FIG. 2 together with the relative sensitivity of the panel.

As is clear from Table 1 and FIG. 2, while Panel E having a fluorescent layer of thickness of about 250$\mu$ has almost the same sensitivity as Panel B having a fluorescent layer of the same thickness as Panel E, the sharpness of Panel E is markedly higher than that of Panel B.

TABLE 1

| Panel | Thickness of Fluorescent Layer ($\mu$) | MTF at 2lp/mm (%) | Relative Sensitivity |
|---|---|---|---|
| A | 250 | 23 | 6.8 |
| E | 250 | 36 | 4.8 |
| B | 250 | 29 | 4.9 |
| C | 300 | 25 | 6.0 |
| D | 350 | 20 | 7.0 |

As is clear from FIG. 2, in comparison of the same sensitivity, the MTF of the radiation image storage panel of the present invention having a light-reflecting white pigment layer is higher than that of the conventional radiation image storage panel. Therefore, the radiation image storage panel of the present invention provides an image of higher sharpness than the conventional radiation image storage panel.

We claim:

1. A radiation image storage panel having a fluorescent layer comprising a binder and a stimulable phosphor dispersed therein upon stimulation by rays having a wavelength ranging from 500 to 800 nm, wherein said phosphor is characterized in that said panel has a light-reflecting white pigment layer on one side thereof with respect to the fluorescent layer opposite to the side exposed to the stimulating rays for said stimulable phosphor and that said phosphor is represented by the following general formula (I) or (II);

$$LnOX:aA \qquad (I)$$

wherein Ln represents an element selected from the group of La, Y, Gd and Lu, X represents an element selected from the group of Cl and Br, A represents an element selected from the group of Ce and TB, and X is a number satisfying the condition of $0 < X < 0.1$;

$$(Ba_{1-x}M^{II}_x)FX_1:yA_1 \qquad (II)$$

wherein $M^{II}$ represents at least one divalent metal selected from the group consisting of Mg, Ca, Sr, Zn and Cd, $X_1$ represents at least one halogen selected from the group consisting of Cl, Br and I, $A_1$ represents at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$.

2. A radiation image storage panel as defined in claim 1 wherein both the mean reflectance of said light-reflecting white pigment layer in the wavelength region of the light emitted by said stimulable phosphor upon stimulation thereof and the mean reflectance of said light-reflecting white pigment layer in the wavelength region of said stimulating rays are not lower than 70%.

3. A radiation image storage panel as defined in claim 1 wherein said panel consists solely of said fluorescent layer and said light-reflecting white pigment layer.

4. A radiation image storage panel as defined in claim 1 wherein said panel comprises a light-reflecting white pigment layer, a fluorescent layer disposed thereon and a protective layer disposed further thereon.

5. A radiation image storage panel as defined in claim 1 wherein said panel comprises a light-reflecting white pigment layer, a subbing layer disposed thereon and a fluorescent layer disposed further thereon.

6. A radiation image storage panel as defined in claim 1 wherein said panel comprises a light-reflecting white pigment layer, a subbing layer disposed thereon, a fluorescent layer disposed further thereon and a protective layer disposed further thereon.

7. A radiation image storage panel as defined in claim 1 wherein said panel comprises a protective layer, a light-reflecting white pigment layer disposed thereon and a fluorescent layer disposed further thereon.

8. A radiation image storage panel as defined in claim 1 wherein said panel comprises a protective layer, a light-reflecting white pigment layer disposed thereon, a subbing layer disposed further thereon and a fluorescent layer disposed further thereon.

9. A radiation image storage panel as defined in claim 1 wherein said panel comprises a first protective layer, a light-reflecting white pigment layer disposed thereon, a subbing layer disposed further thereon, a fluorescent layer disposed further thereon and a second protective layer disposed further thereon.

10. A radiation image storage panel as defined in claim 1 wherein said panel comprises a substrate, a light-reflecting white pigment layer disposed thereon and a fluorescent layer disposed further thereon.

11. A radiation image storage panel as defined in claim 1 wherein said panel comprises a substrate, a light-reflecting white pigment layer disposed thereon, a subbing layer disposed further thereon and a fluorescent layer disposed further thereon.

12. A radiation image storage panel as defined in claim 1 wherein said panel comprises a substrate, a light-reflecting white pigment layer disposed thereon, a subbing layer disposed further thereon, a fluorescent layer disposed further thereon and a protective layer disposed further thereon.

13. A radiation image storage panel as defined in claim 1 wherein at least a layer of said panel existing on the side exposed to said stimulating rays with respect to said light-reflecting white pigment layer is colored with a colorant so that the mean reflectance of said panel in the wavelength region of said stimulating rays of said stimulable phosphor is lower than the mean reflectance of said panel in the wavelength region of said light emitted by said stimulable phosphor upon stimulation thereof.

14. A radiation image storage panel as defined in claim 13 wherein the mean reflectance of said panel in the wavelength region of said stimulating rays is not higher than 95% of the mean reflectance of a panel equivalent to said panel except for being uncolored with said colorant in the wavelength region of said stimulating rays.

15. A radiation image storage panel as defined in claim 13 wherein the mean reflectance in said panel in the wavelength region of said light is not lower than 30% of the mean reflectance of a panel equivalent to said panel except for being uncolored with said colorant in the wavelength region of said light.

16. A radiation image storage panel as defined in claim 15 wherein said mean reflectance in said panel is not lower than 90% of the mean reflectance of said equivalent panel.

17. A radiation image storage panel as defined in claim 13 wherein said panel consists solely of said light-reflecting white pigment layer and said fluorescent layer, and said fluorescent layer is colored with said colorant.

18. A radiation image storage panel as defined in claim 13 wherein said panel comprises a light-reflecting white pigment layer, a fluorescent layer disposed thereon and a protective layer disposed further thereon, and said fluorescent layer and said protective layer is colored with said colorant.

19. A radiation image storage panel as defined in claim 13 wherein said panel comprises a light-reflecting white pigment layer, a subbing layer disposed thereon and a fluorescent layer disposed further thereon, and said subbing layer and said fluorescent layer is colored with said colorant.

20. A radiation image storage panel as defined in claim 13 wherein said panel comprises a light-reflecting white pigment layer, a subbing layer disposed thereon, a fluorescent layer disposed further thereon and a protective layer disposed further thereon, and said subbing layer, said fluroescent layer and said protective layer are colored with said colorant.

21. A radiation image storage panel as defined in claim 13 wherein said panel comprises a protective layer, a light-reflecting white pigment layer disposed thereon and a fluorescent layer disposed further thereon, and said fluorescent layer is colored with said colorant.

22. A radiation image storage panel as defined in claim 13 wherein said panel comprises a protective layer, a light-reflecting white pigment layer disposed thereon, a subbing layer disposed further thereon and a fluorescent layer disposed further thereon, and said subbing layer and said fluorescent layer is colored with said colorant.

23. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said subbing layer, said fluorescent layer and second protective layer are colored with said colorant.

24. A radiation image storage panel as defined in claim 13 wherein said panel comprises a substrate, a light-reflecting white pigment layer disposed thereon and a fluorescent layer disposed further thereon, and said fluorescent layer is colored with said colorant.

25. A radiation image storage panel as defined in claim 13 wherein said panel comprises a substrate, a light-reflecting white pigment layer disposed thereon, a subbing layer disposed further thereon and a fluorescent layer disposed further thereon, and said subbing layer or said fluorescent layer is colored with said colorant.

26. A radiation image storage panel as defined in claim 13 wherein said panel comprises a substrate, a light-reflecting white pigment layer disposed thereon, a subbing layer disposed further thereon, a fluorescent layer disposed further thereon and a protective layer disposed further thereon, and said subbing layer, said fluorescent layer and said protective layer are colored with said colorant.

27. A radiation image storage panel as defined in claim 13 wherein said panel comprises a light-reflecting white pigment layer, a fluorescent layer disposed thereon and a protective layer disposed further thereon, and said fluorescent layer is colored with said colorant.

28. A radiation image storage panel as defined in claim 13 wherein said panel comprises a light-reflecting white pigment layer, a fluorescent layer disposed thereon and a protective layer disposed further thereon, and said protective layer is colored with said colorant.

29. A radiation image storage panel as defined in claim 13 wherein said panel comprises a light-reflecting white pigment layer, a subbing layer disposed thereon and a fluorescent layer disposed further thereon, and said subbing layer is colored with said colorant.

30. A radiation image storage panel as defined in claim 13 wherein said panel comprises a light-reflecting white pigment layer, a subbing layer disposed thereon and a fluorescent layer disposed further thereon, and said fluorescent layer is colored with said colorant.

31. A radiation image storage panel as defined in claim 13 wherein said panel comprises a light-reflecting white pigment layer, a subbing layer disposed thereon, a fluorescent layer disposed further thereon and a protective layer disposed further thereon, and said subbing layer is colored with said colorant.

32. A radiation image storage panel as defined in claim 13 wherein said panel comprises a light-reflecting white pigment layer, a subbing layer disposed thereon, a fluorescent layer disposed further thereon and a protective layer disposed further thereon, and said fluorescent layer disposed is colored with said colorant.

33. A radiation image storage panel as defined in claim 13 wherein said panel comprises a light-reflecting white pigment layer, a subbing layer disposed thereon and a protective layer disposed further thereon, and protective layer is colored with said colorant.

34. A radiation image storage panel as defined in claim 13 wherein said panel comprises a light-reflecting white pigment layer, a subbing layer disposed thereon, a fluorescent layer disposed further thereon, and a protective layer disposed further thereon, and said subbing layer and said fluorescent layer are colored with said colorant.

35. A radiation image storage panel as defined in claim 13 wherein said panel comprises a light-reflecting white pigment layer, a subbing layer disposed thereon a fluorescent layer disposed further thereon and a protective layer disposed further thereon, and said subbing layer and said protective layer are colored with said colorant.

36. A radiation image storage panel as defined in claim 13 wherein said panel comprises a light-reflecting white pigment layer, a subbing layer disposed thereon, a fluorescent layer disposed further thereon and a protective layer disposed further thereon, and said fluorescent layer and said protective layer are colored with said colorant.

37. A radiation image storage panel as defined in claim 13 wherein said panel comprises a protective layer, a light-reflecting white pigment layer disposed thereon, a subbing layer disposed further thereon and a fluorescent layer disposed further thereon, and said subbing layer is colored with said colorant.

38. A radiation image storage panel as defined in claim 13 wherein said panel comprises a protective layer, a light-reflecting white pigment layer disposed thereon, a subbing layer disposed further thereon and a fluorescent layer disposed further thereon, and said fluorescent layer is colored with said colorant.

39. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said subbing layer is colored with said colorant.

40. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said fluorescent layer is colored with said colorant.

41. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said second protective layer is colored with said colorant.

42. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said subbing layer and said fluorescent layer are colored with said colorant.

43. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said subbing layer and said second protective layer are colored with said colorant.

44. A radiation image storage panel as defined in claim 13 wherein said panel comprises a first protective layer, a light-reflecting white pigment layer disposed thereon, a subbing layer disposed further thereon, a fluorescent layer disposed further thereon and a second protective layer disposed further thereon, and said fluorescent layer and said second protective layer are colored with said colorant.

45. A radiation image storage panel as defined in claim 13 wherein said panel comprises a substrate, a light-reflecting white pigment layer disposed thereon, a subbing layer disposed further thereon and a fluorescent layer disposed further thereon, and said subbing layer is colored with said colorant.

46. A radiation image storage panel as defined in claim 13 wherein said panel comprises a substrate, a light-reflecting white pigment layer disposed thereon, a subbing layer disposed further thereon and a fluorescent layer disposed further thereon, and said fluorescent layer is colored with said colorant.

47. A radiation image storage panel as defined in claim 13 wherein said panel comprises a substrate, a light-reflecting white pigment layer disposed thereon, a subbing layer disposed further thereon, a fluorescent layer disposed further thereon and a protective layer disposed further thereon, and said subbing layer is colored with said colorant.

48. A radiation image storage panel as defined in claim 13 wherein said panel comprises a substrate, a light-reflecting white pigment layer disposed thereon, a subbing layer disposed further thereon, a fluorescent layer disposed further thereon and a protective layer disposed further thereon, and said fluorescent layer is colored with said colorant.

49. A radiation image storage panel as defined in claim 13 wherein said panel comprises a substrate, a light-reflecting white pigment layer disposed thereon, a subbing layer disposed further thereon, a fluorescent layer disposed further thereon and a protective layer disposed further thereon, and said protective layer is colored with said colorant.

50. A radiation image storage panel as defined in claim 13 wherein said panel comprises a substrate, a light-reflecting white pigment layer disposed thereon, a subbing layer disposed further thereon, a fluorescent layer disposed further thereon and a protective layer disposed further thereon, and said subbing layer and said fluorescent layer are colored with said colorant.

51. A radiation image storage panel as defined in claim 13 wherein said panel comprises a substrate, a light-reflecting white pigment layer disposed thereon, a subbing layer disposed further thereon, a fluorescent layer disposed further thereon and a protective layer disposed further thereon, and said subbing layer and said protective layer are colored with said colorant.

52. A radiation image storage panel as defined in claim 13 wherein said panel comprises a substrate, a lilght-reflecting white pigment layer disposed thereon, a subbing layer disposed further thereon, a fluorescent layer disposed further thereon and a protective layer disposed further thereon, and said fluorescent layer and said protective layer are colored with said colorant.

53. A radiation image storage panel as defined in claim 1 wherein said fluorescent layer comprises $BaFBr:Eu^{2+}$.

54. A radiation image storage panel as defined in claim 1 wherein said image storage panel is scanned by using He-Ne laser beam.

55. A radiation image storage panel as defined in claim 1 wherein said image storage panel comprises a colorant having a body color ranging from blue to green.

56. A process for producing an image by using radiation image storage panel having a fluorescent layer comprising a binder and a stimulable phosphor dispersed therein upon stimulation by rays having a wavelength ranging from 500 to 800 nm, wherein said phosphor is characterized in that said panel has a light-reflecting white pigment layer on one side thereof with respect to the fluorescent layer opposite to the side exposed to the stimulating rays for said stimulable phosphor and that said phosphor is represented by the following general formula (I) or (II);

$$LnOX:aA \qquad (I)$$

wherein Ln represents an element selected from the group of La, Y, Gd and Lu, X represents an element selected from the group of Cl and Br, A represents an element selected from the group of Ce and Tb, and a is a number satisfying the condition of $0<a<0.1$;

$$(Ba_{1-x}M^{II}{}_x)FX_1:yA_1 \qquad (II)$$

wherein $M^{II}$ represents at least one divalent metal selected from the group consisting of Mg, Ca, Sr, Zn and Cd, $X_1$ represents at least one halogen selected from the group consisting of Cl, Br and I, $A_1$ represents at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, said process comprising the steps of (i) causing said panel to absorb a radiation passing through an object (ii) scanning said panel with He-Ne laser beam to sequentially release the radiation energy stored in the stimulable phosphor of the panel as light emission, and (iii) electrically converting the emitted light to a visible image.

* * * * *